No. 861,803. PATENTED JULY 30, 1907.
V. R. BROWNING.
SLAG HANDLING PLANT.
APPLICATION FILED JULY 13, 1903.
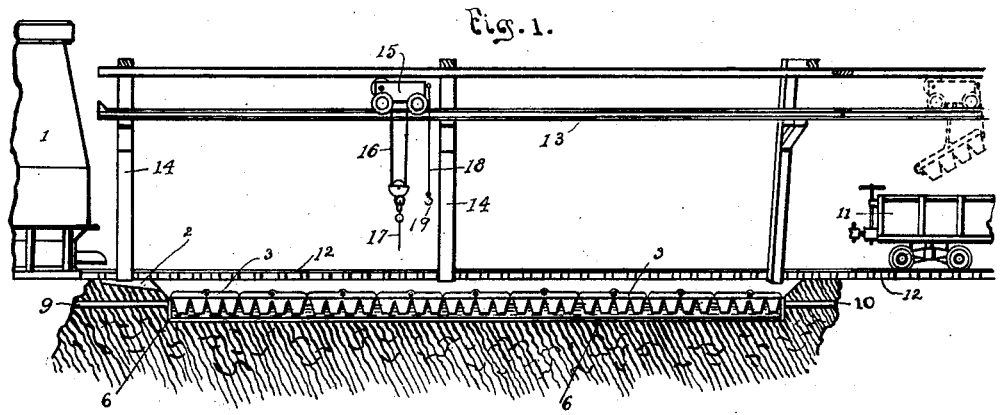
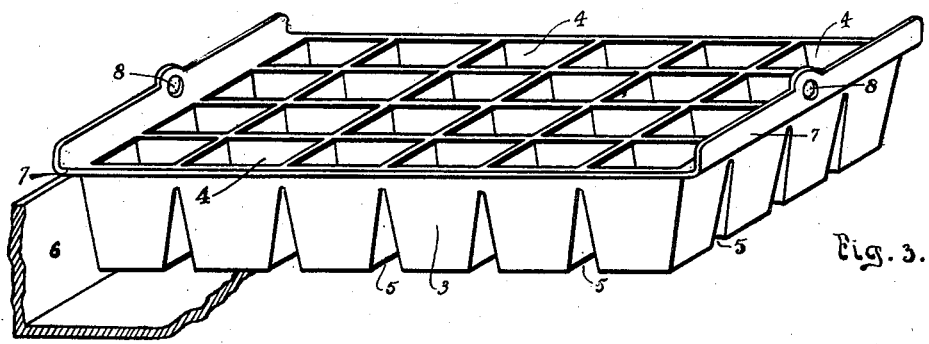
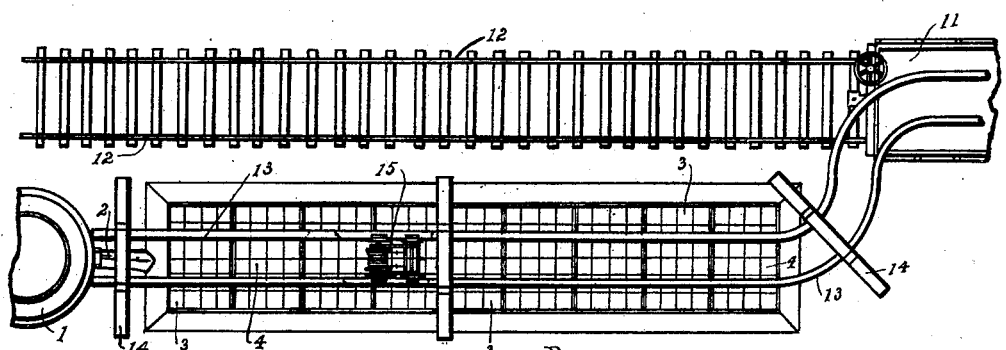
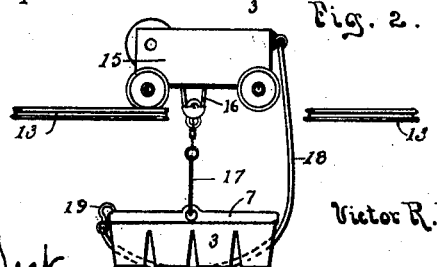
WITNESSES: Victor R. Browning, INVENTOR.
BY
ATTORNEY

UNITED STATES PATENT OFFICE.

VICTOR R. BROWNING, OF NOTTINGHAM, OHIO.

SLAG-HANDLING PLANT.

No. 861,803.  Specification of Letters Patent.  Patented July 30, 1907.

Application filed July 13, 1903. Serial No. 165,285.

*To all whom it may concern:*

Be it known that I, VICTOR R. BROWNING, a citizen of the United States, residing at Nottingham, in the county of Cuyahoga and State of Ohio, have invented a new and useful Improvement in Slag-Handling Plants, of which the following is a specification.

This invention relates to a plant for the removal of slag from blast furnaces, and has for its objects the production of a plant of this character by means of which the slag can be quickly cooled and economically removed from the furnace.

In the drawings, in which similar reference characters designate corresponding parts throughout the several views, Figure 1 is a sectional elevation through my improved slag-handling plant; Fig. 2 is a plan view of the said plant; Fig. 3 is a perspective view of one of the slag pans and a portion of the large cooling pan or basin upon which the slag pans are supported; and Fig. 4 is an enlarged view of the trolley and a slag-pan showing the means for dumping the latter.

Referring now to the drawings, 1 represents a blast furnace, and 2 the trench extending therefrom through which the slag is permitted to flow into the slag pans 3. These pans are preferably of the form shown in Fig. 3, being rectangular in plan view, and being divided by transverse and longitudinal partitions into pockets 4. The sides of these partitions diverge as they extend downwardly so as to leave a wedge-shaped space 5 between the adjacent sides of the pockets. This divergence of the sides affords the proper amount of draft in the pockets so that the hardened slag can be readily dumped when the pans are inverted, and the spaces 5 permit the circulation of the water, as hereinafter described, so that the slag in the pockets is quickly cooled.

6 is a large cooling pan or basin for supporting the slag pans, said pans having a flange 7 extending from either end so as to project over and rest upon the upper edge of the pan 6. The flanges are angular in section, as shown, and at their centers they are provided with holes 8, for a purpose hereinafter described. The cooling pan or basin 6 is intended to be supplied and almost filled with water, the same being admitted through the pipe 9 and discharged through the pipe 10, said pipes being at the opposite ends of the pan. The slag pans are supported so as to leave a space below the bottom of the pockets 4 through which, and through the spaces 5, the cooling water can freely circulate.

When in position in the cooling pan, the slag-pans rest with their adjacent edges in close contact so that when one pan is filled the overflow will pass into the next pan, and so on until the entire series of pans is filled. As shown in Fig. 1, the slag first fills the slag-pan at the left; and then as more slag is run in it passes on to the right filling the pans one after the other. At the same time the water is circulating about the pockets 4 which quickly cools the slag therein so that it can be loaded in the car 11 which may be run in upon any conveniently located track, as shown at 12.

For the purpose of lifting and conveying the pans 3 and the slag from the cooling pan to the car, I provide a crane structure consisting of the runways 13 that are supported upon the trestles 14 and upon which runs the trolley 15. This trolley lifts the slag-pans by means of the cable 16 and the attaching hooks 17, said hooks being adapted to engage with the holes 8 in the flange of the pans. Having lifted the pan the trolley can be run out over the car 11 and the pan dumped. The dumping may be effected in any suitable manner, but I prefer to use the means shown, which consists of a dumping rope 18 that is attached to the trolley 15, said rope carrying a hook 19 that is adapted to be attached to the edge of the pan, the rope passing beneath the pan, as shown. When the pan is lifted the hook may be attached, and then when it is lowered it will be upset, as indicated in dotted lines in Fig. 1.

It will be understood that instead of having a pan 6 for the cooling water, any form of pool or basin may be employed, suitable provision being made for supporting the slag-pans.

Having thus described my invention, what I claim as new and desire to secure by Letters-Patent is:

1. In a slag handling plant, a cooling-pan or basin, means for admitting water to and for discharging it from said basin, a plurality of slag-pans supported side by side on said cooling-pan, the adjacent edges of the slag-pans being fitted together so that the slag will flow from one to the other, inclined partitions in the slag-pans for dividing the same into pockets and for affording spaces between the pockets through which the water can circulate, flanges on the slag-pans for supporting the latter on the cooling-pan or basin, said flanges being provided with holes, means for engaging in the said holes for lifting the slag-pans, and means for conveying and dumping the pans.

2. In a slag-handling plant, a cooling pan or basin, means for admitting and discharging water therefrom, a slag pan having flanges projecting from its ends and adapted to rest upon and be stationarily supported by the cooling pan so that the water can circulate about the slag pan, and means for removing the slag pan from the cooling pan.

3. In a slag handling plant, a cooling pan or basin, means for admitting or discharging water therefrom, a slag pan adapted to be stationarily supported in said cooling pan so that the water can circulate about the same, means for filling said slag pan with slag, a crane structure, a trolley supported upon said structure and adapted to travel thereon, and means connected with said trolley for lifting the slag pan and for conveying it to a position for dumping.

4. In a slag handling plant, a cooling pan or basin, means for admitting and discharging water therefrom, a series of slag pans supported side by side within said cooling pan, said slag pans being so constructed that the slag will flow from one pan to the adjacent pan, means for conducting slag to the end pan of the series so that the other pans are filled from the overflow from the said end pan, a crane structure, a trolley mounted upon said crane structure and adapted to travel thereon, and means on said trolley for lifting the slag pans, one at a time, and for conveying the same to the position for dumping.

5. In a slag handling plant, a cooling pan or basin, means for admitting and discharging water therefrom, a slag pan adapted to be supported within the cooling pan so that the water in the latter can circulate about the slag pan, a crane structure, a trolley mounted upon said crane structure and adapted to travel thereon, means on said trolley for lifting the slag pan and for conveying it to the position for dumping, a hook supported from said trolley, said hook being adapted to engage with the slag pan whereby, when said pan is lowered, it will be tilted and dumped.

In testimony whereof I affix my signature in the presence of two witnesses.

VICTOR R. BROWNING.

Witnesses:
S. E. FOUTS,
W. D. BROWNING.